Jan. 19, 1965   T. R. SCHMIDT   3,166,710
APPARATUS HAVING SEGMENTED PICKUP COIL AND OUTPUT CIRCUIT
MEANS RESPONSIVE TO SIGNALS FROM A SINGLE COIL SEGMENT
Filed Nov. 14, 1960

INVENTOR:
T. R. SCHMIDT
BY Theodore E. Bieber
HIS ATTORNEY

United States Patent Office 3,166,710
Patented Jan. 19, 1965

3,166,710
APPARATUS HAVING SEGMENTED PICKUP COIL AND OUTPUT CIRCUIT MEANS RESPONSIVE TO SIGNALS FROM A SINGLE COIL SEGMENT
Thomas R. Schmidt, Lafayette, Calif., assignor to Shell Oil Company, New York, N.Y., a corporation of Delaware
Filed Nov. 14, 1960, Ser. No. 68,737
3 Claims. (Cl. 324—34)

This invention relates to eddy current instruments and more particularly to a pick-up coil for an eddy current instrument which has increased sensitivity.

Eddy current instruments of the type utilizing a source or exciting coil for inducing an alternating magnetic field in a material and a pick-up coil for detecting the magnetic field induced are widely used for locating flaws or imperfections in metallic materials. An eddy current instrument of this type detects a flaw by detecting the metal loss due to the flaw. Thus, the sensitivity of the instrument is roughly the ratio of the minimum detectable metal loss as caused by the flaw compared to the total amount of material seen by the probe. Attempts to improve the sensitivity of this type of instrument usually involves modifications which enable the instrument to detect smaller and smaller ratios of metal loss to metal scanned. These improvements consist of coil balancing as well as special circuits which tend to increase the gain of the instrument. All of these improvements eventually reach a limitation caused by the signal to noise ratio in the instrument. The noise in the case of eddy current instruments is due to the variation of permeability, conductivity or dimension of the material being inspected and these variations may be caused by the heterogeneity of the material composition or strains induced in the material due to heat treating or forming operations. Once the limit of signal to noise ratio is reached, no further improvement can be accomplished by increasing the instrument's sensitivity to the metal loss to metal scanned ratio. Any further improvement in the instrument's sensitivity must be as a result of signal analysis or manipulation, such as phase sensitive detection or modulation analysis.

Accordingly, it is the principal object of this invention to provide a pick-up coil which increases the ratio of metal loss to metal scanned by the probe of an eddy current instrument.

A further object of this invention is to provide an eddy current instrument with a novel pick-up coil utilizing a plurality of individual coil segments disposed in a circular arrangement.

A still further object of this invention is to provide in eddy current instruments utilizing a segmented pick-up coil a circuit which will transmit and record only the signal from the individual coil segment which sees the greatest flaw in the material.

The above objects and advantages of this invention are achieved by providing an eddy current instrument having a source or exciting coil and pick-up coil spaced therefrom. The pick-up coil is formed from a plurality of arcuate shaped individual segments which are disposed to form a single circular coil. The signal from each individual segment is coupled to a wave squaring and differentiating circuit with the output of the individual wave squaring and differentiating circuits being coupled in parallel to a bistable multivibrator (flip-flop) circuit. The output of the flip-flop circuit is coupled to a phase meter to which the alternating power supply for the exciting coil is also coupled. The phase meter supplies an output signal which represents the phase difference between the source signal and the signal from the pick-up coil.

With proper spacing of this array of pick-up coils with respect to the exciter, the eddy currents they detect will follow the classical eddy current equations. These are:

$$\beta = \beta_0 e^{-2\pi d \sqrt{\frac{f\mu}{\rho \times 10^3}}} \sin\left(2\pi f t - 2\pi d \sqrt{\frac{f\mu}{\rho \times 10^3}}\right)$$

where $\beta$ = magnetic flux density at depth $(d)$
$\beta_0$ = magnetic flux density at surface
$d$ = depth (cm.)
$f$ = frequency in cycles per second
$\mu$ = relative permeability
$\rho$ = resistivity in micro-ohm cm.
$t$ = time in seconds From this equation it is seen that the flux density at any depth varies sinusoidally and is attenuated to a value $$\beta_0 e^{-2\pi d \sqrt{\frac{f\mu}{\rho \times 10^3}}}$$

and lags in phase by $$2\pi d \sqrt{\frac{f\mu}{\rho \times 10^3}}$$

Thus when one of the individual segments of the pick-up coil sees a flaw in the material being inspected $(d)$ will be less and its signal will lag the source signal by less than signals from the remaining segments which do not see a flaw and have a normal value of $(d)$. Accordingly, the wave squaring and differentiating circuit will supply a positive signal or pip of short duration when the signal from the segment seeing the flaw reaches a positive value and a negative pip when it reaches a negative value. In contrast the differentiating and wave squaring circuits coupled to the remaining segments will supply positive pips which occur after the positive pip from the segment seeing the flaw and the negative pip after the negative pip of the segment seeing the flaw. Accordingly, the flip-flop circuit will act as an auctioneering circuit and is operated by the positive and negative pips from the segment seeing the flaw and thus supply an alternating signal having square wave form whose phase is directly related to the phase of the original signal from the segment seeing the flaw. The phase of this signal may then be compared to the phase of the power supply to determining the magnitude of the flaw.

The above objects and advantages of this invention will be more easily understood from the following detailed description of a preferred embodiment when taken in conjunction with the attached drawing; in which.

Figure 1:
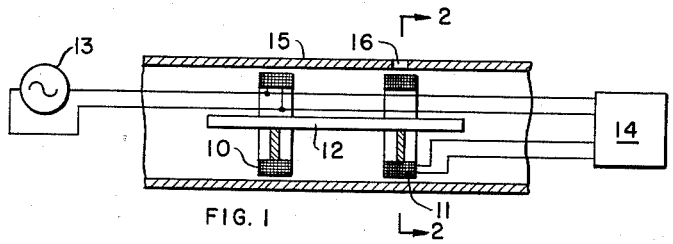
FIGURE 1 is a longitudinal section of an eddy current type of instrument constructed in accordance with this invention and adapted to inspect tubular members.

Referring now to FIGURE 1, there is shown an eddy current instrument having an exciting or source coil 10 and a pick-up coil 11. Both of the coils are coaxially mounted on a supporting member and are spaced axially a distance sufficient to substantially eliminate any direct coupling between the coils. The exciting coil 10 is coupled to an alternating current power supply 13 while both the individual segments of the pick-up coil 11 and the power supply 13 are coupled to a recording circuit 14. The details of the recording circuit 14 will be described below with reference to FIGURE 2. The eddy current instrument of FIGURE 1 is adapted to be inserted into and passed through the interior of the tubular member 15 which is shown as having a hole 16 opposite the location of the pick-up coil 11.

Figure 2:
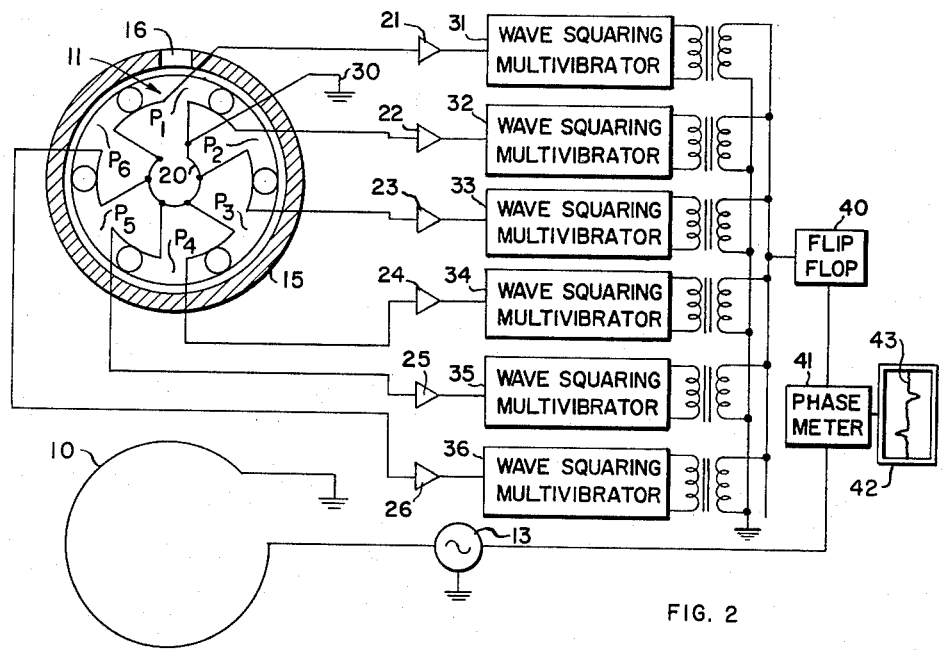
FIGURE 2 is a block diagram showing the circuitry used in this invention.

Referring now to FIGURE 2, there is shown a vertical section of the pick-up coil 11 with the six individual arcuate shaped coil segments being illustrated by single turn coils P1, P2, P3, P4, P5 and P6. One end of each of the individual coils P1 to P6 is coupled to a ground buss 20 which is grounded at 30. The other end of the coil P1 is coupled to an amplifier 21 while the remaining coils P2 to P6 are coupled to similar amplifiers 22 to 26, respectively. The individual amplifiers 21 to 26 are coupled to individual wave squaring and differentiating circuits 31 to 36, respectively. The wave squaring and differentiating circuits 31-36 should be capable of converting the alternating signals of coils P1-P6 to a square wave form and then differentiating the square wave to provide a short positive signal or pip indicating the start of the positive portion of the square wave signal and a similar negative pip which indicates the start of the negative portion of the square wave signal. One circuit which may be used is a simple trigger or flip-flop circuit coupled to an output transformer.

The individual wave squaring and differentiating circuits 31-36 are coupled in parallel to a common buss 37 which in turn is coupled to a flip-flop circuit 40. The flip-flop circuit 40 may also be a simple trigger circuit and converts the positive and negative pips received from the wave squaring and differentiating circuits to an alternating signal having a square wave form. The flip-flop circuit 40 in turn is coupled to a phase meter 41. Also coupled to the phase meter 41 is the alternating current power supply 13 which supplies power to the exciting coil 10. The phase meter 41 should be capable of determining the phase difference between the power supply and the alternating signal received from the flip-flop circuit 40 and supplying an output signal proportional thereto. The phase meter is coupled to a recording instrument, for example chart recorder 42, which plots a single curve 43 whose amplitude indicates the location and magnitude of flaws in the tubular member 15. Of course, the chart drive of the recorder 42 should be synchronized with the movement of the instrument probe through the tubular member 15.

As is seen in FIGURE 2, the pick-up coil 11 consists of six individual arcuate shaped segments which are disposed to form a single circular shaped coil. While the coils are shown as single turn coils in FIGURE 2, in actual practice they would consist of a number of turns, the exact number depending upon the particular design of the instrument and the use for which it was intended. Also as seen in FIGURE 2 the coil P1 is disposed directly under the hole 16 occurring in the tubular member 15 while the remaining coils P2 to P6 see only the solid wall of the material. Thus, as explained above, the signal induced in the coil P1 by the alternating magnetic field induced in the member 15 by the exciting coil 10 will lag behind the power source coupled to the exciting coil 10 by fewer electrical degrees than the signal induced in the remaining coils P2 to P6.

Figure 3:
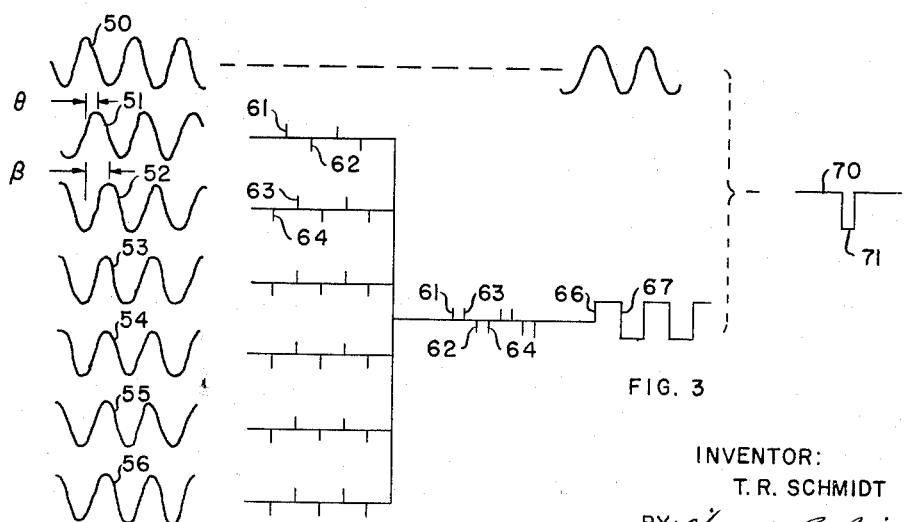
FIGURE 3 is a series of wave forms showing the signals generated in the various portions of the circuit shown in FIGURE 2 by the individual segments of the pick-up coil.

The operation of the above-described segmented pick-up coil will be more easily understood by referring to FIGURE 3 showing the wave form of signals that occur in various portions of the instrument described above. The wave worm 50 illustrates the alternating signal from the power supply 13 which is supplied to both the exciting coil 10 and the phase meter 41. The wave forms 51 to 56 represent the wave form of the signals induced in the individual coils P1-P6 by the alternating magnetic field in the tubular member 15. The alternating magnetic field is of course induced in the tubular member 15 by the exciting coil 10. As can be seen in FIGURE 3, the signal represented by the wave form 51 lags behind the signal represented by the wave form 50 an amount illustrated by the angle $\theta$. Similarly, the wave forms 52 to 56 lag behind the wave form 50 by an amount illustrated by the angle $\beta$. It can also be seen that the wave forms 52-56 lag by approximately 180 electrical degrees while the wave form 51 lags by an amount of less than 180 electrical degrees. When the signals having wave forms 51-56 are passed through the wave squaring and differentiating circuits 31-36 they will be converted to a series of positive and negative pips. The signal 51 will be converted to a positive pip 61 and a negative pip 62 while the remaining wave forms 52-56 will be converted to a series of positive pips 63 and negative pips 64. As seen in FIGURE 3, the positive pip 61 leads the positive pip 63 by an amount equal to the difference between the angles $\beta$ and $\beta$. When the signals from the circuits 31-36 are combined the positive pip 61 will lead the positive pip 63, also, all of the positive pips 63 and negative pips 64 will occur substantially simultaneously and thus appear as a single positive pip 63 and a single negative pip 64 in the signal being supplied to the flip-flop circuit 40. The flip-flop circuit 40 should be adjusted so that it will assume one condition of operation upon the occurrence of the first positive pip and its opposite condition of operation on the occurrence of the next negative pip. Thus, the positive pip 61 will cause the flip-flop circuit 40 to assume one condition of operation while the negative pip 62 will change it to its other condition of operation. Accordingly, the output signal form the flip-flop circuit 40 will have a square wave form in which the leading edge 66 of the positive portion will correspond to the occurrence of the positive pip 61 and the leading edge 67 of the negative portion will correspond to the occurrence of the negative pip 62. Also, the leading edge 66 of the positive portion of the square wave form will correspond to the point at which the signal 51 passed through zero in a negative to positive direction while the leading edge 67 of the negative portion will correspond to the point at which the signal 51 was passing through zero in a positive to negative direction. Accordingly, the square wave signal from the flip-flop circuit will have the same phase relationship as the original signal 51. Also, it should be noted that the positive pip 63 and negative pip 64 which represent the signals 52 to 56 do not effect the operation of the flip-flop circuit since they are not the first occurring positive or negative pips, respectively. Thus, it is seen that the signal from the individual coil segment seeing the most important or largest flaw, for example hole 16 is passed through the circuit to the phase meter 41, while the circuit at the same time discriminates or eliminates the signals from the remaining segments. The phase meter 41 of course compares the phase of the signal from the flip-flop circuit with the phase of the signal from the power supply and supplies an output signal having a fixed or constant amplitude 70 which decreases to an amplitude 71 representing the phase difference between the two signals when the pick-up coil is adjacent to the hole 16. The duration of the signal at the amplitude 71 will be related to the duration of the phase difference between the two signals which is of course related to the magnitude of the flaw being detected.

From the above description, it can be seen that the sensitivity of an eddy current instrument has been increased by decreasing the amount of metal scanned by the individual coil segments forming the pick-up coil. Thus, the ratio of the volume of the flaw to the volume of the metal scanned has been increased and the overall sensitivity of the instrument increased. While the sensitivity has been increased by increasing in effect the number of pick-up coils the required associated circuitry has not been increased in proportion since the associated circuitry only transmits the signal from the coil segment which sees the largest flaw. While one particular auctioneering circuit has been described for transmitting the signal from the segment seeing the largest flaw while discriminating against all signals, other circuits may be designed to accomplish this same purpose. Likewise, other circuits may be devised for performing the wave squaring and differentiating function other than the combination trigger circuit and transformer described above. Also of course this invention may be applied to other types of eddy current instruments than those designed to inspect the interior of tubular members as described above.

Accordingly, this invention should not be limited to the details described herein but only to its broad spirit and scope.

I claim as my invention:

1. An instrument for electro magnetically testing a material comprising: an exciter coil, a source of alternating current, said exciter coil being coupled to said source of alternating current; a pick-up coil, said pick-up coil being formed by a plurality of individual coils of substantially equal electrical characteristics, said individual coils in addition being disposed in a circular pattern with equal spacings between the centers of the coils; a plurality of wave squaring and differentiating circuits each of said individual coils being coupled to a separate wave squaring and differentiating circuit; a flip-flop circuit, each of said wave squaring and differentiating circuits being coupled in parallel to said flip-flop circuit; a phase comparing circuit, said flip-flop and said alternating current being coupled to said phase comparing circuit to provide a signal related to phase difference between said alternating current and the signal from said flip-flop circuit.

2. An instrument for electro magnetically testing a material comprising: an exciter coil; a source of alternating current, said exciter coil being coupled to said source of alternating current; a pick-up coil, said pick-up coil being formed by a plurality of individual coils of substantially equal electrical characteristics, said individual coils in addition being disposed in a circular pattern with equal spacings between the centers of the coils; a plurality of amplifiers each of said individual coils being coupled to one of said separate amplifiers; a plurality of first multivibrator circuits, each of said separate amplifiers being coupled to one of said first multivibrator circuits, a plurality of output transformers, each of said multivibrators being coupled to a separate one of said output transformers; a second multivibrator circuit, said separate output transformers being coupled in parallel to said second multivibrator circuit; a phase detecting means, both said second multivibrator and said source of alternating current being coupled to said phase detecting means and a recording means, said phase detecting means being coupled to said recording means to record the difference in phase between said source and the signal from said second multivibrator.

3. A pick-up coil system for an eddy current testing instrument having an exciter coil coupled to a source of alternating current, said pick-up coil system comprising: a pick-up coil formed from a plurality of individual coils, said individual coils being disposed in a closed pattern with equal spacing between the centers of the coils; a plurality of individual amplifying and differentiating circuit means, each of said individual coils being coupled to one of said amplifying and differentiating circuit means; an auctioneering circuit, said individual amplifying and differentiating circuits being coupled to said auctioneering circuit in parallel, said auctioneering circuit passing only the first occurring signal from said individual coils.

References Cited in the file of this patent
UNITED STATES PATENTS

| | | |
|---|---|---|
| 2,124,579 | Kerr et al. | July 26, 1938 |
| 2,558,485 | Gow | June 26, 1951 |